(12) United States Patent
Belisario et al.

(10) Patent No.: US 9,218,481 B2
(45) Date of Patent: Dec. 22, 2015

(54) MANAGING PASSWORD STRENGTH

(75) Inventors: Ella Belisario, Boca Raton, FL (US); Dwayne Dames, Boynton Beach, FL (US); Jonathan Palgon, Boynton Beach, FL (US); Roberto Vila, Hollywood, FL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 320 days.

(21) Appl. No.: 13/600,588

(22) Filed: Aug. 31, 2012

(65) Prior Publication Data

US 2014/0068731 A1 Mar. 6, 2014

(51) Int. Cl.
G06F 21/31 (2013.01)
G06F 21/46 (2013.01)

(52) U.S. Cl.
CPC ..................................... *G06F 21/46* (2013.01)

(58) Field of Classification Search
CPC ........ G06F 21/46; H04L 63/08; H04L 63/083
See application file for complete search history.

(56) References Cited

U.S. PATENT DOCUMENTS

| 7,200,754 | B2 * | 4/2007 | Walters | ......................... 713/182 |
| 8,689,001 | B1 * | 4/2014 | Satish et al. | .................. 713/182 |
| 8,769,607 | B1 | 7/2014 | Jerdonek et al. | |
| 2009/0158406 | A1 | 6/2009 | Jancula et al. | |
| 2009/0241187 | A1 | 9/2009 | Troyansky | |
| 2011/0083172 | A1 | 4/2011 | Heim et al. | |
| 2012/0079568 | A1 * | 3/2012 | Whitmyer, Jr. | ................... 726/4 |
| 2012/0167225 | A1 * | 6/2012 | Gomez et al. | .................. 726/26 |

OTHER PUBLICATIONS

"System and method for measuring the strength of a users password based on users public information", IP.com Prior Art Database, IP.com No. IPCOM000210924D, Sep. 16, 2011, Author Unknown.*
"Hint for 'What password [strength] category This machine requires'", Jun. 17, 2008, IP.com, IP.com No. IPCOM000171712D, found on the world wide web at: http://ip.com/IPCOM/000171712.
"Password Edit Control with Integrated Optical Policy and Strength Validation", Jul. 14, 2010, IP.com, IP.com No. IPCOM000197146D, found on the world wide web at: http://ip.com/IPCOM/000197146.
"System and Method for Measuring the Strength of a Users Password Based on Users Public Information", Sep. 16, 2011, IP.com, IP.com No. IPCOM000210924D, found on the world wide web at: http://ip.com/IPCOM/000210924.
Ma et al, "Password Entropy and Password Quality", 2010 Fourth International Conference on Network and System Security, IEEE computer Society, pp. 583-587.

(Continued)

*Primary Examiner* — Peter Poltorak
*Assistant Examiner* — Huan V Doan
(74) *Attorney, Agent, or Firm* — Paul S. Drake (57) ABSTRACT

A system or computer usable program product for managing password strength including receiving a password on a data processing system for a user, filtering for personal information about the user from multiple independent data sources accessible across a computer network, computing the password strength by the data processing system using an algorithm which compares the password to the filtered personal information about the user, and presenting feedback to the user through a user interface on a data processing system display regarding the computed password strength.

18 Claims, 8 Drawing Sheets

(56) References Cited

OTHER PUBLICATIONS

Salem et al, "Intelligent System to Measure the Strength of Authentication", Apr. 7-11 2008, Information and Communication Technologies: From Theory to Applications, 2008, 3rd International Conference.

"The Password Meter—Password Strength Checker", www.passwordmeter.com, found on the world wide web at www.passwordmeter.com.

* cited by examiner

MANAGING PASSWORD STRENGTH

BACKGROUND

1. Technical Field

The present invention relates generally to managing password strength, and in particular, to a computer implemented method for managing password strength utilizing personalized information.

2. Description of Related Art

In computer science, a password is a secret word, phrase, or string of characters that is used to prove identity and gain access to a resource such as a file, application or data processing system. A password may be composed of letters, numbers, and special characters. Passwords are generally used by persons logging onto various types of accounts. Communications between computer systems generally utilize cryptographic protocols rather than passwords.

For security, a user should keep his or her password secret. To prevent a password from being stolen, it should be either memorized and/or securely stored. Passwords may be forgotten so users tend to use passwords that are easy to remember. However, such passwords may also be easy to guess. As a result, many accounts requiring passwords will have certain password requirements such as minimum length, special characters, etc. to help prevent users from using easily guessed passwords.

SUMMARY

The illustrative embodiments provide a system and computer usable program product for managing password strength including receiving a password on a data processing system for a user, filtering for personal information about the user from multiple independent data sources accessible across a computer network, computing the password strength by the data processing system using an algorithm which compares the password to the filtered personal information about the user, and presenting feedback to the user through a user interface on a data processing system display regarding the computed password strength.

BRIEF DESCRIPTION OF THE SEVERAL VIEWS OF THE DRAWINGS

The novel features believed characteristic of the invention are set forth in the appended claims. The invention itself, further objectives and advantages thereof, as well as a preferred mode of use, will best be understood by reference to the following detailed description of illustrative embodiments when read in conjunction with the accompanying drawings, wherein:

DETAILED DESCRIPTION

Steps may be taken to manage password strength of a user password by computing password strength based on personal information of the user. This personal information can be identified from multiple independent sources and can include a wide variety of data items including family member names, milestone dates, and even passwords previously used by the user. In addition, the public availability of much of the personal information can be computed by looking for that personal information in public settings such as by on-line sources. If a user password includes personal information, especially if that personal information is publicly available, then the user password may be computed to be a weak password. These steps may be taken as will be explained with reference to the various embodiments below.

Figure 1:
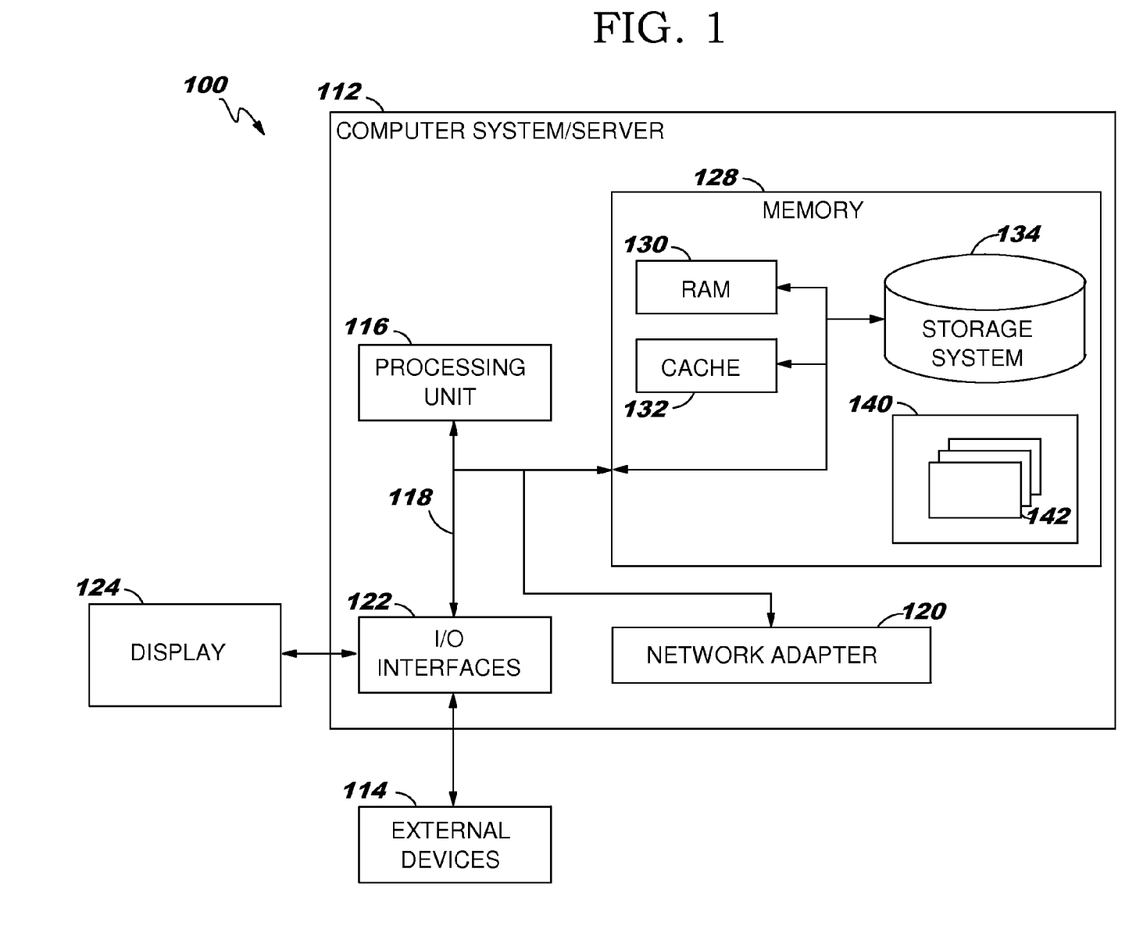
FIG. 1 is a block diagram of a data processing system in which various embodiments may be implemented.

FIG. 1 is a block diagram of a data processing system in which various embodiments may be implemented. Data processing system 100 is only one example of a suitable data processing system and is not intended to suggest any limitation as to the scope of use or functionality of embodiments of the invention described herein. Regardless, data processing system 100 is capable of being implemented and/or performing any of the functionality set forth herein.

In data processing system 100 there is a computer system/server 112, which is operational with numerous other general purpose or special purpose computing system environments, peripherals, or configurations. Examples of well-known computing systems, environments, and/or configurations that may be suitable for use with computer system/server 112 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 112 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 112 may be practiced in distributed computing environments where tasks are performed by remote processing devices that are linked through a communications network. In a distributed computing environment, program modules may be located in both local and remote computer system storage media including memory storage devices.

As shown in FIG. 1, computer system/server 112 in data processing system 100 is shown in the form of a general-purpose computing device. The components of computer system/server 112 may include, but are not limited to, one or more processors or processing units 116, a system memory 128, and a bus 118 that couples various system components including system memory 128 to processor 116.

Bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 112 typically includes a variety of computer system readable media. Such media may be any available media that is accessible by computer system/server 112, and it includes both volatile and non-volatile media, removable and non-removable media.

System memory 128 can include computer system readable media in the form of volatile memory, such as random access memory (RAM) 130 and/or cache memory 132. Computer system/server 112 may further include other removable/non-removable, volatile/non-volatile computer system storage media. By way of example, storage system 134 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 118 by one or more data media interfaces. Memory 128 may include at least one program product having a set (e.g., at least one) of program modules that are configured to carry out the functions of embodiments of the invention. Memory 128 may also include data that will be processed by a program product.

Program/utility 140, having a set (at least one) of program modules 142, may be stored in memory 128 by way of example, and not limitation, as well as an operating system, one or more application programs, other program modules, and program data. Each of the operating system, one or more application programs, other program modules, and program data or some combination thereof, may include an implementation of a networking environment. Program modules 142 generally carry out the functions and/or methodologies of embodiments of the invention. For example, a program module may be software for managing password strength.

Computer system/server 112 may also communicate with one or more external devices 114 such as a keyboard, a pointing device, a display 124, etc.; one or more devices that enable a user to interact with computer system/server 112; and/or any devices (e.g., network card, modem, etc.) that enable computer system/server 112 to communicate with one or more other computing devices. Such communication can occur via I/O interfaces 122 through wired connections or wireless connections. Still yet, computer system/server 112 can communicate with one or more networks such as a local area network (LAN), a general wide area network (WAN), and/or a public network (e.g., the Internet) via network adapter 120. As depicted, network adapter 120 communicates with the other components of computer system/server 112 via bus 118. It should be understood that although not shown, other hardware and/or software components could be used in conjunction with computer system/server 112. Examples, include, but are not limited to microcode, device drivers, redundant processing units, external disk drive arrays, RAID systems, tape drives, and data archival storage systems, etc.

Figure 2:
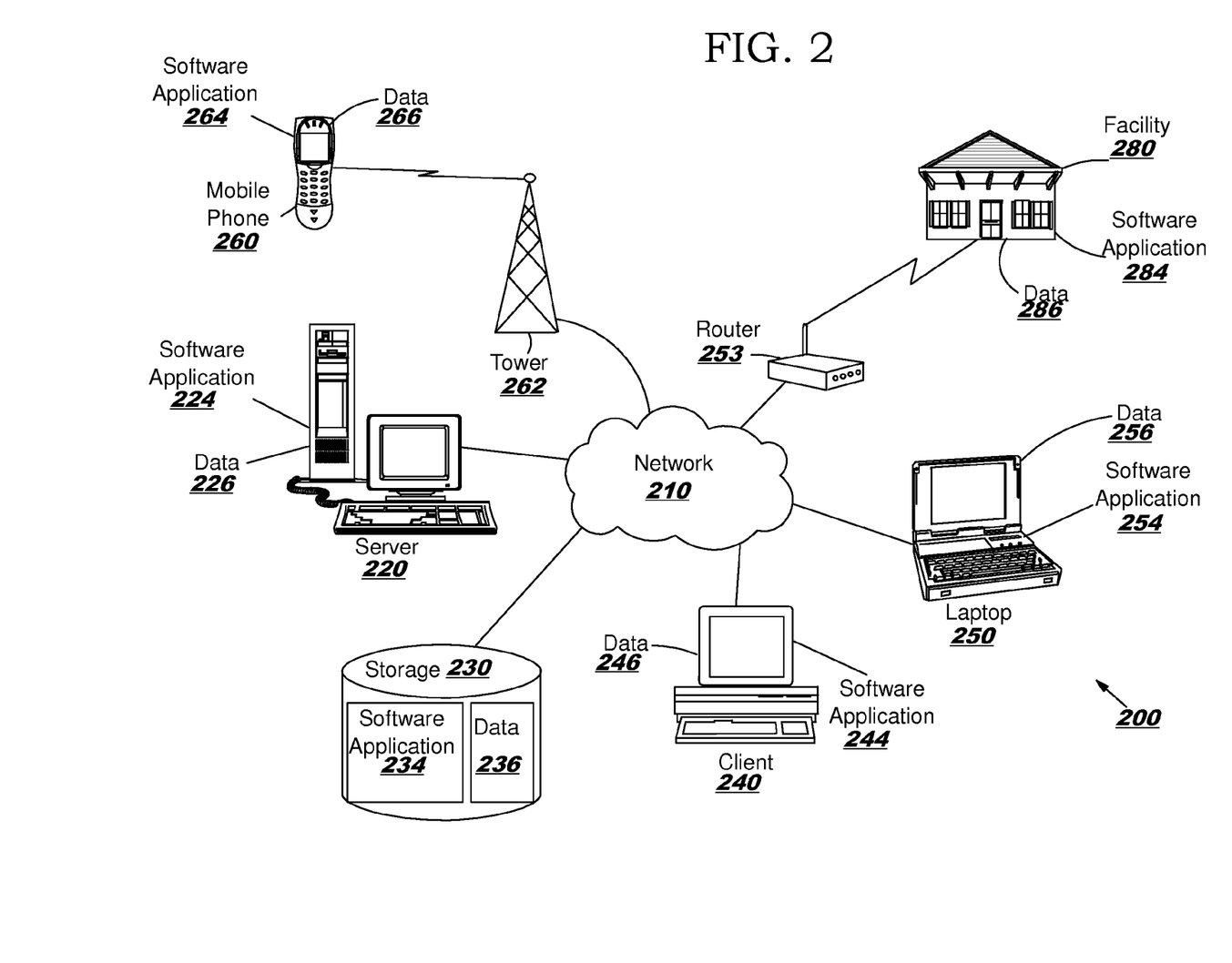
FIG. 2 is a block diagram of a network of data processing systems in which various embodiments may be implemented.

FIG. 2 is a block diagram of a network of data processing systems in which various embodiments may be implemented. Data processing environment 200 is a network of data processing systems such as described above with reference to FIG. 1. Software applications may execute on any computer or other type of data processing system in data processing environment 200. Data processing environment 200 includes network 210. Network 210 is the medium used to provide simplex, half duplex and/or full duplex communications links between various devices and computers connected together within data processing environment 200. Network 210 may include connections such as wire, wireless communication links, or fiber optic cables.

Server 220 and client 240 are coupled to network 210 along with storage unit 230. In addition, laptop 250 and facility 280 (such as a home or business) are coupled to network 210 including wirelessly such as through a network router 253. A mobile phone 260 may be coupled to network 210 through a mobile phone tower 262. Data processing systems, such as server 220, client 240, laptop 250, mobile phone 260 and facility 280 contain data and have software applications including software tools executing thereon. Other types of data processing systems such as personal digital assistants (PDAs), smartphones, tablets and netbooks may be coupled to network 210.

Server 220 may include software application 224 and data 226 for managing password strength or other software applications and data in accordance with embodiments described herein. Storage 230 may contain software application 234 and a content source such as data 236 for use in managing password strength. Other software and content may be stored on storage 230 for sharing among various computer or other data processing devices. Client 240 may include software application 244 and data 246. Laptop 250 and mobile phone 260 may also include software applications 254 and 264 and data 256 and 266. Facility 280 may include software applications 284 and data 286. Other types of data processing systems coupled to network 210 may also include software applications. Software applications could include a web browser, email, or other software application that can manage password strength.

Server 220, storage unit 230, client 240, laptop 250, mobile phone 260, and facility 280 and other data processing devices may couple to network 210 using wired connections, wireless communication protocols, or other suitable data connectivity. Client 240 may be, for example, a personal computer or a network computer.

In the depicted example, server 220 may provide data, such as boot files, operating system images, and applications to client 240 and laptop 250. Server 220 may be a single computer system or a set of multiple computer systems working together to provide services in a client server environment. Client 240 and laptop 250 may be clients to server 220 in this example. Client 240, laptop 250, mobile phone 260 and facility 280 or some combination thereof, may include their own data, boot files, operating system images, and applications. Data processing environment 200 may include additional servers, clients, and other devices that are not shown.

In the depicted example, data processing environment 200 may be the Internet. Network 210 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 2 is intended as an example, and not as an architectural limitation for the different illustrative embodiments.

Among other uses, data processing environment 200 may be used for implementing a client server environment in which the embodiments may be implemented. A client server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

Figure 3A:
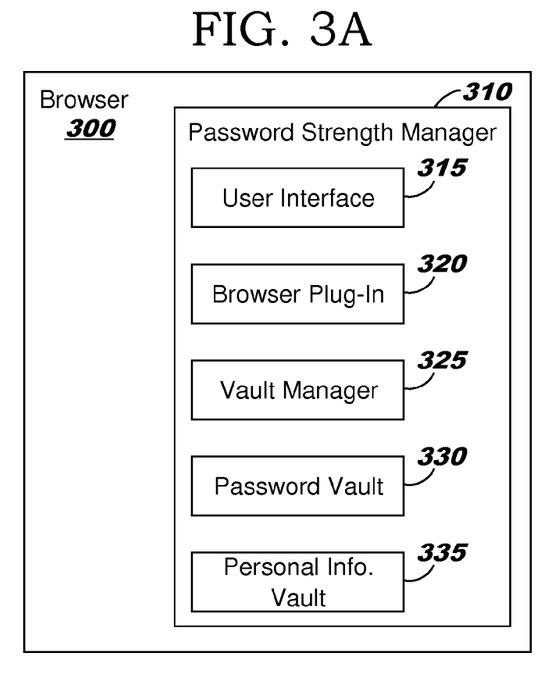
FIG. 3A is a block diagram of a browser utilizing a password strength manager in accordance with a first embodiment.

FIG. 3A is a block diagram of a browser utilizing a password strength manager in accordance with a first embodiment. A browser 300 may be included on a data processing system such as described above with reference to FIG. 1. Browser 300 is used for browsing the internet and includes a password strength manager 310 to help the user choose strong passwords. Strong passwords are passwords that are difficult for third parties to generate, whether by guessing or by using available information such as personal information or other passwords. The password strength manager includes a user interface 315, a browser plug-in 320, a vault manager 325, a password vault 330 and a personal information vault 335. User interface 315, browser plug-in 320, and personal information vault 335 may each be part of a password strength management utility installed by a user on the data processing system. Vault manager 325 and password vault 330 may each be part of a standard browser 300 known in the art. Alternative embodiments may utilize alternative configurations of these various elements.

A user may acquire the password strength management utility to assist the user in maintaining strong passwords across the user's various on-line accounts and websites accessed by the user. The accounts may be social networking sites, financial sites, various types of service accounts (e.g. airline mileage accounts), etc. This password strength management utility may work in conjunction with existing infrastructure of a browser. For example, the browser may already include a password vault and vault manager. However, in this embodiment the password strength management utility may incorporate the preexisting password vault and vault manager into the password manager 310.

User interface 315 is utilized to query the user for certain personal information during installation, for testing or computing passwords for strength, and for interacting with the user should a password have insufficient strength. During installation of the password strength management utility, user interface 315 may ask the user for his or her name, address, phone number(s), family members, high school and college graduation years, birthdate, anniversary date, etc. Many of these types of information are described below with reference to FIG. 5. Because the user installed the password strength manager utility, it is not unexpected for the user interface to request this information. User interface 315 also manages computing the strength of a password and any subsequent interaction with the user when a password is being provided for an account. That is, the user interface may interrupt the user when during password entry across multiple accounts and websites to let the user know that the password is not strong. This process is described below with reference to FIG. 6.

Browser plug-in 320 is utilized to observe the browsing by the user for identifying when a password is being entered on any account or website, for identifying additional personal data, and for computing the public availability of information provided by the user. Browser plug-in 320 may observe web pages being rendered and determine that certain fields require a password. If the web page is previously known for requiring a previously submitted password, the browser plug-in may ignore that password as having been previously computed for strength. Alternatively, the user may select that all passwords being computed for strength even if they were tested previously. If a new password is being provided or if the user selected that all passwords be checked, then user interface 315 may be utilized for computing the password strength and providing feedback to the user if the password does not have sufficient strength.

Vault manager 325 is utilized to manage the security of password vault 330 and personal information vault 335. That is, vault manager 325 securely manages the reading and writing of passwords and personal information in password vault 330. This is to prevent the unauthorized access of this sensitive information by software or persons through other software. The passwords and information may be encrypted and a token based system may be utilized to determine whether software is authorized to access this information.

Password vault 330 contains passwords previously utilized by the user for various on-line accounts. Password vaults are known in the art and various techniques may be utilized for encrypting and securing this type of information such as by vault manager 325.

Personal information vault 335 contains a personal information database of personal information. This personal information may be provided by the user during installation of the password management utility or detected by the browser plug-in during user browsing. Such personal information may be sensitive and may be stored similar to passwords, although alternative security schemes may be utilized. In an alternative embodiment, the personal information may be stored within password vault 330.

Figure 3B:
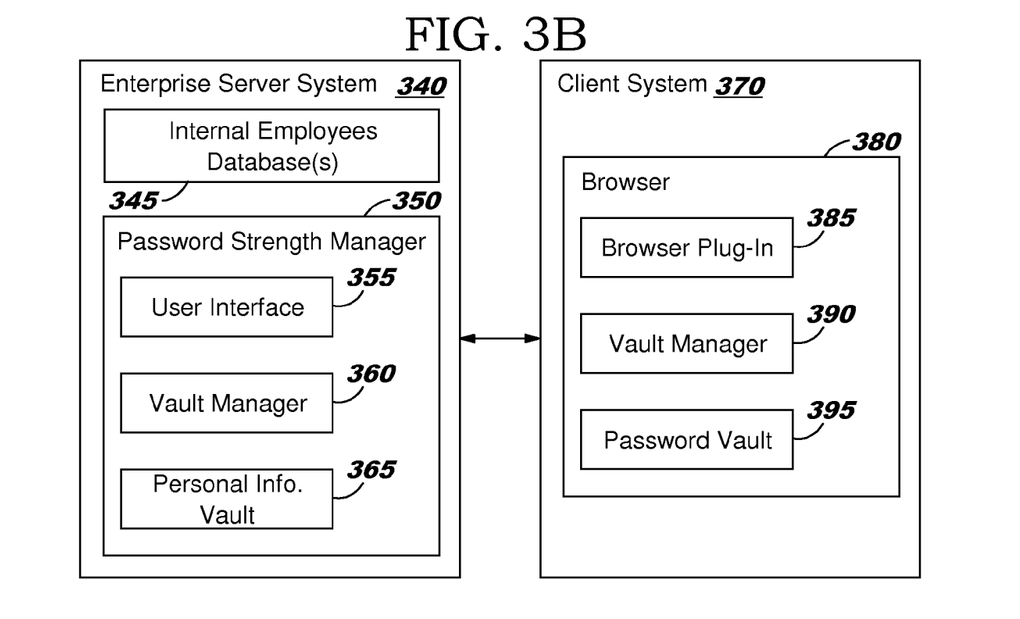
FIG. 3B is a block diagram of an enterprise server utilizing a password strength manager in accordance with a second embodiment.

FIG. 3B is a block diagram of an enterprise server utilizing a password strength manager in accordance with a second embodiment. An enterprise server system 340 with an internal employee database(s) 345 and a password strength manager 350 is in communication with a client system 370 with a browser 380. In this embodiment, password strength manager 350 centrally manages password strength across an enterprise including multiple client systems such as described above with reference to FIG. 2. This helps employees and other internal or external users of enterprise clients use secure and strong passwords across all multiple accounts and websites, thereby reducing the likelihood of a breach. In alternative embodiments, alternative configurations may be implemented including spreading password strength management across a cloud implementation or using a server based configuration where there is no client system browser plug-in.

Password strength manager 350 includes a user interface 355, a vault manager 360 and a personal information vault 365. User interface 355 is utilized to collect a set of personal information for each new user, for computing passwords for strength, and for interacting with the user should a password have insufficient strength. When a new user such as a new employee is added to the enterprise, user interface 355 obtains personal information about the user from internal employee database(s) such as the human relations database, employment resume database, or other internal employee information database. This information may include the user's name, address, phone number(s), birthdate, college attended, names of dependents such as those covered by the enterprise health care policy, etc. This information is highly sensitive and may be stored in personal information vault 365 through vault manager 360. Alternatively, personal information vault may contain pointers to the personal information in the internal employee database(s) so that the same sensitive information is not stored in multiple locations. This approach would help maintain data security and avoid data divergence should the data in the internal employee database(s) change unbeknownst to the personal information vault. User interface 355 also manages computing the strength of a password and any subsequent interaction with the user when a password is being provided for an account. That is, the user interface may interrupt the user when during password entry across multiple accounts and websites to let the user know that the password is not strong. This process is described below with reference to FIG. 6.

Vault manager 360 is utilized to manage the security of personal information vault 365. That is, vault manager 360 securely manages the reading and writing of personal information in personal information vault 365. This is to prevent the unauthorized access of this sensitive information by software or persons through other software. The personal information may be encrypted and a token based system may be utilized to determine whether software is authorized to access this information. Personal information vault 365 contains personal information gathered from internal employee database 345 as well as personal information accessed by the user on client system 370. Vaults are known in the art and various techniques may be utilized for encrypting and securing this type of information such as by vault manager 360.

Browser 380 includes a browser plug-in 385, vault manager 390 and password vault 395. Browser plug-in 385 is utilized to observe the browsing by the user for identifying when a password is being entered on any account or website, for identifying additional personal data, and for computing the public availability of personal information obtained about the user. Browser plug-in 385 may be added to browser 380 by password strength manager 350. Browser plug-in 385 observes web pages being rendered and determines that certain fields require a password. If the web page is previously known for requiring a previously submitted password, the browser plug-in may ignore that password as having been previously computed for strength. Alternatively, the enterprise may select that all passwords being computed for strength even if they were tested previously. If a new password is being provided or if the enterprise selected that all passwords be computed, then browser plug-in 385 may alert user interface 355 to compute the password strength and provide feedback to the user if the password does not have sufficient strength.

Vault manager 390 is utilized to manage the security of password vault 395. That is, vault manager 390 securely manages the reading and writing of passwords in password vault 395. This is to prevent the unauthorized access of this sensitive information by software or persons through other software. The passwords may be encrypted and a token based system may be utilized to determine whether software is authorized to access this information. Password vault 395 contains passwords previously utilized by the user for various on-line accounts. Password vaults are known in the art and various techniques may be utilized for encrypting and securing this type of information such as by vault manager 390.

Figure 4:
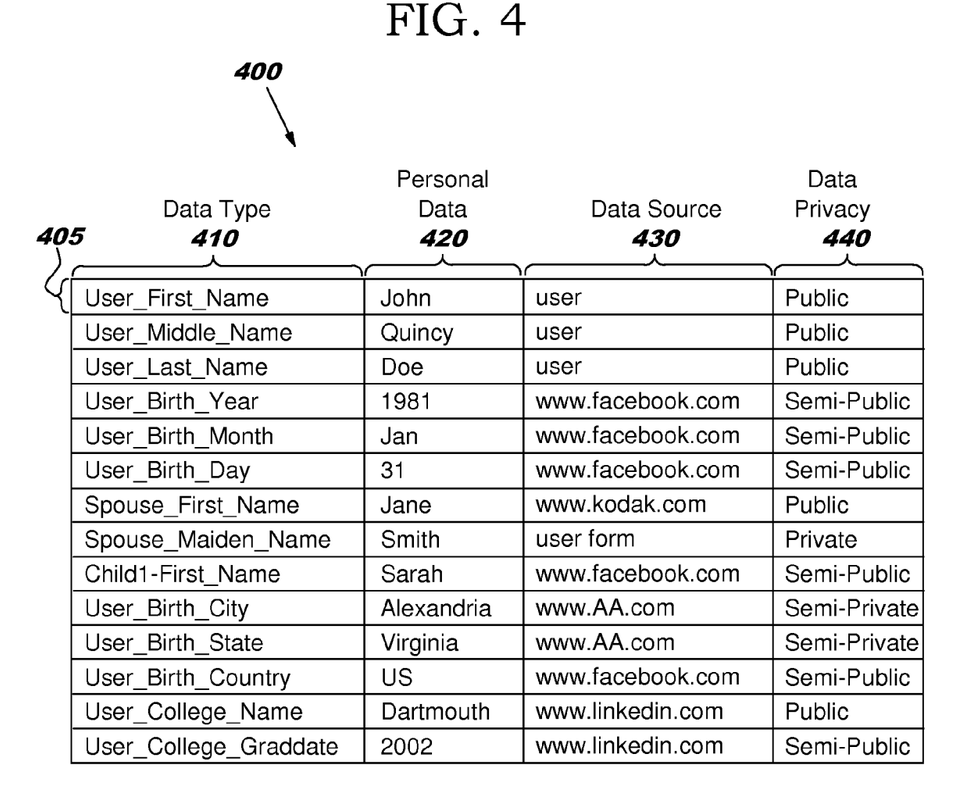
FIG. 4 is a diagram of personal information which may be stored in a personal information vault in which various embodiments may be implemented.

FIG. 4 is a diagram of personal information which may be stored in a personal information vault in which various embodiments may be implemented. Various types of personal data is filtered and stored in a personal information database 400 stored in a personal information vault. This personal data can include multiple personal data items such as a name of a spouse, a name of a child, a name of a family member, a name of a friend, a name of a pet, a place of birth, a residence name, a residence location, a friend name, a sports team, a current employer name, a previous employer name, a current school, a previous school, an important year milestone, a graduation date, a birth date, a wedding date, a child birth year, a user name, a pseudonym, an e-mail address, etc. Personal information can also include passwords utilized by the user and the public availability of the various data items. These data items may be filtered from multiple independent data sources across a computer network such as the internet as described below with reference to FIGS. 5A and 5B including the user, an internal employee database, a form completed on-line, a social networking site, a first website, a second website independent from the first website (having a different domain), an email, a calendar, a to-do list, a password vault, and a location data item. These data items may be stored granularly for ease of finding uses of that data in passwords.

Personal information database 400 includes multiple data items such as data item 405. Each data item includes data type 410, personal data 420, data source 430 and a data privacy ranking or rating 440. Data type 410 may be from a set list of data types that may be supplemented by multiple occurrences of other types of data as will be described below with reference to FIGS. 5A and 5B. Personal data 420 is the data obtained that fits the data type. Data source 430 is the source of the personal data which can be the user in response to queries (such as in the first embodiment), an internal employee database (such as in the second embodiment), the user completing forms on-line, websites, social networking sites, emails, calendars, to-do lists, other passwords the user has employed, location data such as check-ins or GPS data, etc. Data privacy 440 is a categorization of how publicly available that data item is for the user. This categorization can be computed by looking at the source of that data item and identifying how publicly available that source is. For example, if a data item is publicly available on a social network site, then it is public. However, if the data item is available on the same social network site but is protected from the public by privacy measures such that it is accessible by a limited number of persons, then that data item may be semi-public. In this embodiment there are four levels of public availability including public, semi-public, semi-private, and private, collectively referred as data privacy. Alternative embodiments may utilize other schemes for ranking, rating or otherwise categorizing how publicly available a data item is for the user.

In an enterprise wide example such as the second embodiment, there may be multiple sets of data items, each set for one user. Each set of data items is referred to herein as a record. There may also be multiple records in a single data processing system such as the first embodiment where multiple users may log-on separately for accessing the same personal system. In such as multi-user environment, whether enterprise or personal, each record may be segregated within the personal information database for security purposes. That is, each record should be stored in such a manner as to make each user unable to access the record of another user.

Figure 5A:
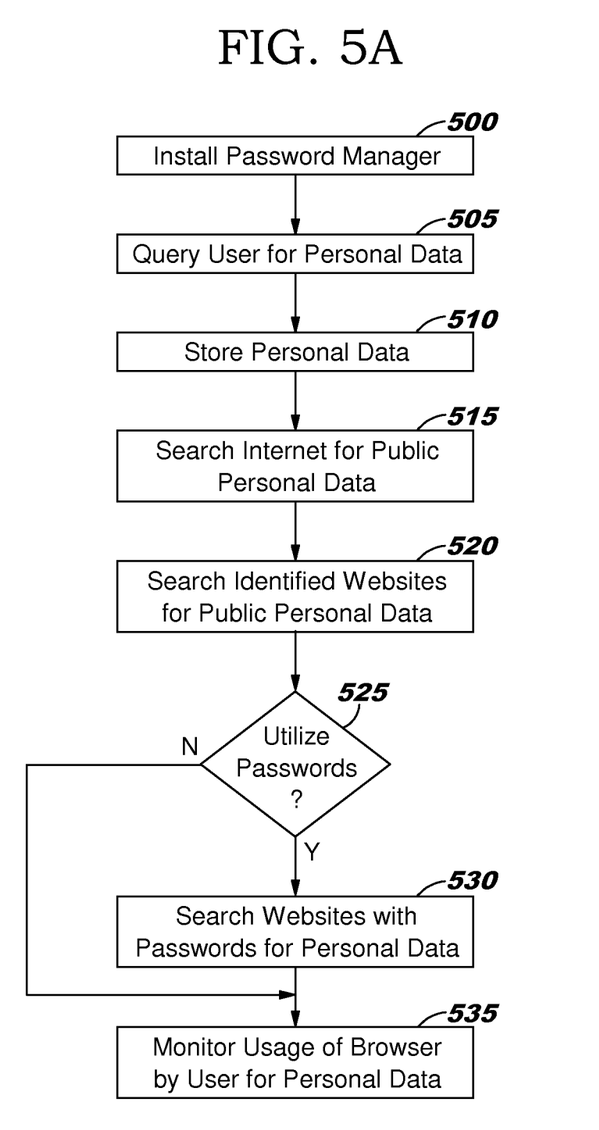
FIG. 5A is a flow diagram of building a personal information database during installation of a password manager in accordance with a first embodiment.
Figure 5B:
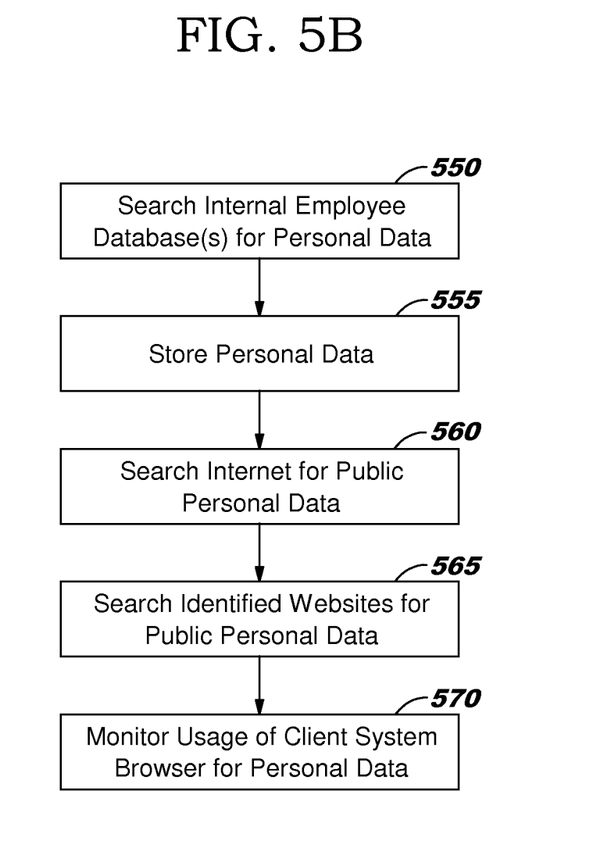
FIG. 5B is a flow diagram of adding personal information database for a new user to a personal information database in accordance with a second embodiment.

FIGS. 5A and 5B are flow diagrams directed to building a personal information database from multiple independent sources. The personal information database may include personal information of a single user or multiple users depending upon the application. The personal information of each user includes multiple personal data items which can be filtered from multiple independent data sources across a computer network including the user, an internal employee database, a form completed on-line, a social networking site, independent websites, an email, a calendar, a to-do list, a password vault, and a location data item. The public availability of each personal data item may be calculated by a general search of public information on the internet using the users name and a review of websites that have been visited by the user such as websites for which the user has passwords.

FIG. 5A is a flow diagram of building a personal information database during installation of a password manager in accordance with a first embodiment. In a first step 500 a password manager is installed into a browser. This can include adding a user interface, a browser plug-in, and a personal information vault to a preexisting vault manager and password vault in the browser. Alternative embodiments may utilize alternative configurations. In a second step 505, the user interface queries the user for personal data such as user name, nickname(s), residence, birthdate, birth location, spouse name, child(ren) name(s), family name(s), friend names, pet name(s), high school, college(s), graduation dates, wedding date, other important dates, sports team, email address(es), etc. This personal data is then stored as data items into the personal information database in step 510 with the user listed as the data source. Most of these data items would be initially categorized as private (i.e. not publicly available) except for the user name which would be categorized initially as public. The user may not complete all data items, which is acceptable as those data items may be completed with the below described steps.

Subsequently in step 515, the browser is utilized to perform searches on the internet across multiple independent websites (having different domains) with one or more search engines based on the user name filtering for public information about the user. For example, if an internet search identifies the address or family members of the user, then that information is stored in the personal information database if it was not previously provided by the user and those identified data items are categorized as public in the database. Processing then continues to step 520 where various websites visited by the user are searched for public data. These websites can be identified by looking at the browser history or by checking for websites identified in the password vault with passwords. At this step, those passwords are not utilized. If any of these searches identifies any of the data items with the user, then those data items are stored in the personal information database if it was not previously provided by the user and those identified data items are categorized as public in the database. Processing then continues to step 525.

In step 525, the user is queried by the user interface whether the password manager may utilize the user's passwords to further improve the personal information database. If not, then processing continues to step 535, otherwise processing continues to step 530. In step 530, the browser may be utilized to search multiple websites with the user's passwords. As each website is accessed and searched, any data items are identified. If any of these identified data items were not previously provided by the user, then they are stored in the personal information database. The type of security for these identified data items is then checked and the identified data items are either categorized as semi-public or semi-private based on the type of website and the type of security measures. For example, if a data item is identified on a social network site with more than a minimum number of other persons having access, then that data items may be categorized as semi-public. For another example, if a data item is identified on a financial website, then that data item may be categorized as semi-private. Processing then continues to step 535.

In step 535, the browser plug-in is then used to follow any internet browsing by the user across multiple independent websites to further identify and categorize data items of the user. This may continue indefinitely unless the user turns off this feature. As further data items are identified, they may be added to the personal information database of the user if they are not already in that database. In addition, based on the website type and security measures, the identified data item may be categorized to a more public category. In this embodiment, a data item may be categorized to a more public category but not to a more private category. That is, once a data item is categorized as semi-public, it may be later categorized as public, but not as semi-private or private. Alternative embodiments may utilize other categorization schemes. Alternative embodiments may also utilize other types of processes to identify and categorize data items.

FIG. 5B is a flow diagram of adding personal information database for a new user to a personal information database in accordance with a second embodiment. In this embodiment, the password strength manager was installed on an enterprise server as described above with reference to FIG. 3B. However, a new user is being added to the system so a record of personal data items needs to be added to the personal information database for the new user. Because this is an enterprise tool, privacy rights of the user need to be maintained and protected. As a result, the information collected, filtered, stored and utilized in this process must be carefully managed. The client system in this embodiment is internal to the enterprise.

In a first step 550, personal information about the user may be obtained from internal employee database(s) such as the human relations database, employment resume database, or other internal employee information database. This personal information can include the user's name, nickname(s), residence, birthdate, birth location, spouse name, child(ren) name(s), family name(s), friend names, pet name(s), high school, college(s), graduation dates, wedding date, other important dates, sports team, email address(es), etc. This personal data is then stored as data items into the personal information database in step 555 with the internal employee database listed as the data source. All of these data items would be initially categorized as private except for the user name due to the source of the information. This process may not complete all data items, which is acceptable as those data items may be completed with the below described steps. All such data other than the name of the employee may be marked as private due to the source of that information. In step 555, that personal information is stored in the personal information database.

Subsequently in step 560, a server browser is utilized to perform searches on the internet across multiple independent websites with one or more search engines based on the user name for publicly available information about the user. For example, if an internet search identifies the address or family members of the user, then that information is stored in the personal information database if it was not previously acquired from internal employee databases. Those identified data items are then categorized as public in the database. Processing then continues to step 565 where various websites visited by the user are searched for publicly available data. These websites can be identified by looking at the client system browser history or by checking for websites identified in the client system password vault with passwords. Those passwords are not utilized in this embodiment. If any of these searches identifies any of the data items with the user, then those data items are stored in the personal information database if it was not previously obtained from internal employee database(s) or in the internet searches. Those identified data items are categorized as public in the database. Processing then continues to step 570.

In step 570, the browser plug-in on the client system is then utilized to follow any internet browsing across multiple independent websites by the user on the enterprise client system to further identify and categorize data items of the user. This may continue indefinitely unless the enterprise turns off this feature. For example, certain countries may not allow this type of activity, so the browser plug-in may be disabled for any employees in those countries. As further data items are identified, they may be added to the personal information database of the user if they are not already in that database. In addition, based on the website type and security measures, the identified data item may be categorized to a more public category. In this embodiment, a data item may be categorized to a more public category but not to a more private category. That is, once a data item is categorized as semi-public, it may be later categorized as public, but not as semi-private or private.

The browser plug-in may also be utilized to identify data items other than the set of expected data items described above. For example, if data items are repeated across multiple websites and accounts, those data items may be identified as personal to the user and may be added to the personal information database. Alternative embodiments may utilize other categorization schemes. Alternative embodiments may also utilize other types of processes to identify and categorize data items.

Figure 6:
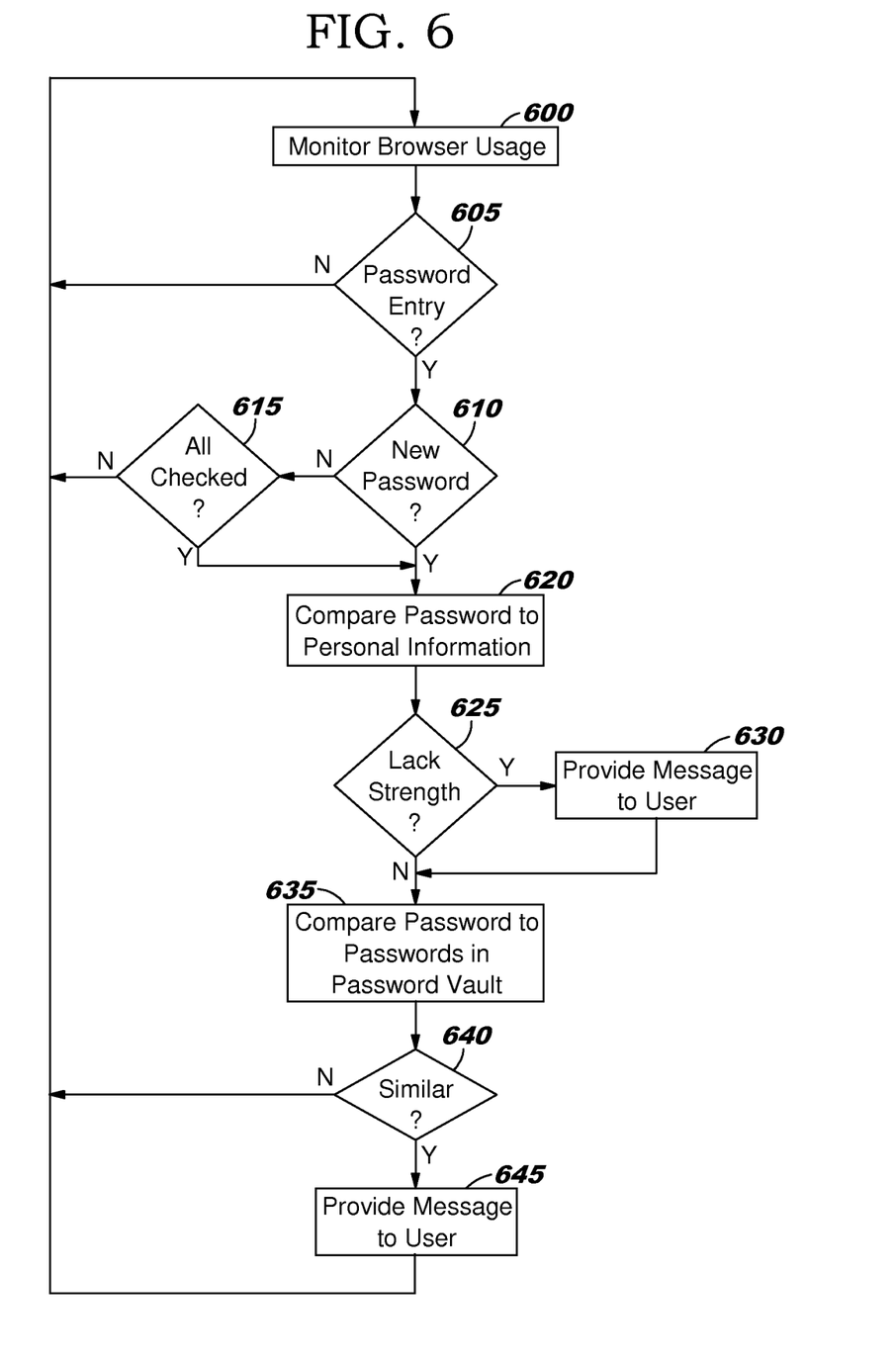
FIG. 6 is a flow diagram of utilizing a personal information database to manage password strength in which various embodiments may be implemented.

FIG. 6 is a flow diagram of utilizing a personal information database to manage password strength in which various embodiments may be implemented. In a first step 600, the browser plug-in monitors the browser activity or other activity of the user across multiple websites and accounts that may require a password. This can include monitoring the webpages and accounts accessed to determine if there is a password field to be completed by the user. In the second embodiment of an enterprise, it can also involve watching for activity by the employee on internal databases or accounts which require a password. Subsequently in step 605, it is determined whether a password is being entered by the user. If not, then processing returns to step 600, otherwise processing continues to step 610. In step 610, it is determined whether this is a new password. This can be determined by examining the password vault. If not, then processing continues to step 615, otherwise processing continues to step 620. In step 615, it is determined whether all passwords are computed for strength or whether only new passwords are computed for strength. If only new passwords are computed for strength, then processing returns to step 600, other processing continues to step 620.

In step 620, the password being entered by the user is compared to personal information of that user in the personal information database in accordance with an algorithm to compute password strength. Due to the granularity of the data items as described above, each data item of the user can be compared in whole to all sequential parts of the password. For example, a data item of ABC may be found in a password of XABCYZ. This comparison can be by using a black and white algorithmic test where any duplication of a data item by any part of the password is deemed weak. Alternatively, this comparison can be by a grading system or other algorithm where a password containing any public or semi-public data item is weak. For example, the algorithm might weigh the personal information based on the number of times that it was discovered, how high the page was in an internet search, or that especially popular social network web sites might have higher weighting. As a result, the degree to which the personal information was publicly accessible in a web search could determine the password strength. In addition, a password containing more than one data item that is semi-private or private may also be considered weak or weaker. Subsequently, in step 625, that comparison is used to compute whether the password lacks strength. If no, then processing continues to step 635. Otherwise, processing continues to step 630 where a message is provided to the user explaining that the password is weak. Such a message may be provided in a pop-up box such as shown below with reference to FIGS. 7A and 7B. In these embodiments, it is up to the user to determine whether to change the weak password or not. Alternatively, particularly with the second embodiment, the user may be required to modify the password to a stronger password. Processing then continues to step 635.

In step 635, the password being entered by the user is compared to other passwords of that user in the password vault. In this case, any sequence of four or more characters in the user provided password that match four or more letters of a password in the password vault would be considered similar and thereby weak. Alternative embodiments may utilize other types of comparison schemes. Subsequently, in step 640, that comparison is used to compute whether the password is similar. If no, then processing returns to step 600. Otherwise, processing continues to step 645 where a message is provided to the user explaining that the password is similar to one or more other passwords. Such a message may be provided in a pop-up box such as shown below with reference to FIGS. 7A and 7B. In these embodiments, it is up to the user to determine whether to change the similar password or not. In an alternative embodiment, particularly as a variation of the second embodiment, the user may be required to modify the password to a stronger less similar password. Processing then returns to step 600.

In an alternative embodiment, password strength based on password length, types of characters used, randomness of character usage, etc. may also be utilized. Another alternative embodiment may generate a password score or ranking or set of scores or ranking based on the above described characteristics to provide to the user. For example, a strong password may be given a score of 90 overall and a weak password may be given a score of 50. These scores or ranks may be combined into a single score or rank or separated into separate scores or ranks. For example a password may be ranked strong for general characteristics (e.g. length), weak for use of personal information that is publicly available, and medium for similarity to other passwords previously used by the user.

Figure 7A:
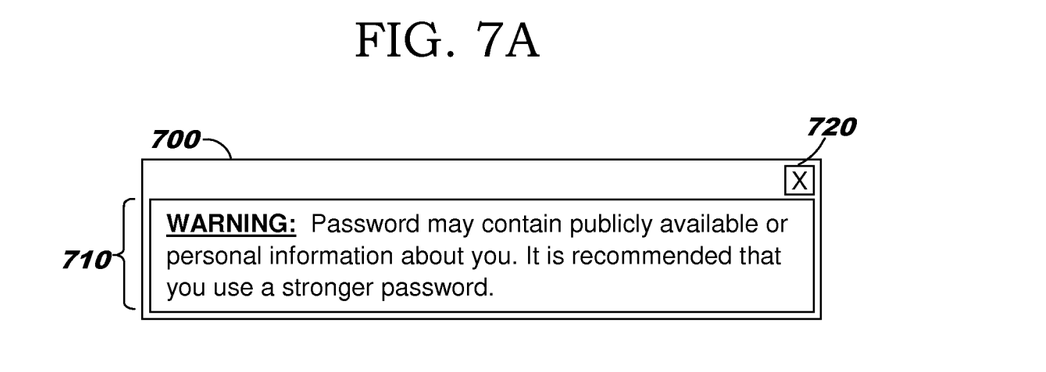
FIGS. 7A and 7B are diagrams of pop-up boxes utilized to communicate with the user in which various embodiments may be implemented.
Figure 7B:
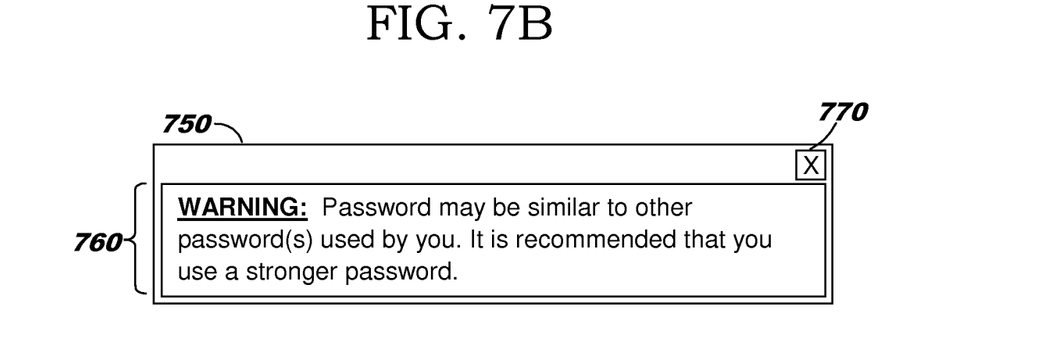

FIGS. 7A and 7B are diagrams of a pop-up boxes utilized to communicate with the user in which various embodiments may be implemented. In FIG. 7A, a user interface pop-up box 700 includes a message 710 notifying the user that the password is weak due to inclusion of personal information and requesting the user to use a different password that is stronger. The user can read this message and close the pop-up box by mouse clicking area 720. In FIG. 7B, a user interface pop-up box 750 includes a message 760 notifying the user that the password is weak due to similarity with other password(s) and requesting the user to use a different password that is stronger. The user can read this message and close the pop-up box by mouse clicking area 770. In alternative embodiments, alternative user interfaces may be utilized for communicating with the user about password strength.

The invention can take the form of an entirely software embodiment, or an embodiment containing both hardware and software elements. In a preferred embodiment, the invention is implemented in software or program code, which includes but is not limited to firmware, resident software, and microcode.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM), or Flash memory, an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code such as for managing password strength. A client data processing system may download that computer usable code, such as for storing on a data storage medium associated with the client data processing system, or for using in the client data processing system. The server data processing system may similarly upload computer usable code from the client data processing system such as a content source. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer usable program product comprising a non-transitory computer usable storage medium including computer usable code for use in managing password strength, the computer usable program product comprising code for performing the steps of:
   receiving a password on a data processing system for a user;
   filtering for personal information about the user from multiple independent data sources accessible across a computer network including, with the user's permission, accessing passwords previously utilized by the user and utilizing those previous passwords to access the data sources across the computer network to filter for personal information about the user;
   categorizing a data privacy for respective personal data items of the filtered personal information, wherein the data privacy categorization is dependent upon a level of public availability of a respective personal data item;
   computing the password strength by the data processing system using an algorithm which compares the password to the respective personal data items of the filtered personal information about the user and uses the data privacy categorization of the respective personal data item utilized in the password in computing the password strength; and
   presenting feedback to the user through a user interface on a data processing system display regarding the computed password strength.

2. The computer usable program product of claim 1 wherein the use of previous passwords to access the data sources for each personal data item affects the data privacy categorization for that personal data item.

3. The computer usable program product of claim 2 wherein the filtered personal information includes multiple personal data items, each personal data item being filtered for publicly availability.

4. The computer usable program product of claim 3 wherein each personal data item is compared to the password by the data processing system to compute password strength.

5. The computer usable program product of claim 1 further comprising code for performing the step of filtering for other passwords utilized by the user, wherein computing the password strength includes the other passwords utilized by the user.

6. The computer usable program product of claim 1 wherein the network is the internet and a browser plug-in filters for the personal information from multiple websites visited by the user across the internet.

7. The computer usable program product of claim 1 wherein there are at least three levels of data privacy categorization available for each personal data item based on a public availability of each personal data item and wherein at least one of the three levels of data privacy categorization is based on personal information accessed using previous passwords.

8. The computer usable program product of claim 1 wherein categorizing the data privacy for respective personal data items includes ranking the data privacy categorization for the personal data items based on the public availability of each personal data item.

9. The computer usable program product of claim 8 wherein the ranking of the data privacy categorization for the personal data items is based on ratings of the data privacy categorization for the personal data items based on the public availability of each personal data item.

10. A data processing system for managing password strength, the data processing system comprising:
    a processor; and
    a memory storing program instructions which when executed by the processor execute the steps of:
    receiving a password on a data processing system for a user;
    filtering for personal information about the user from multiple independent data sources accessible across a computer network including, with the user's permission, accessing passwords previously utilized by the user and utilizing those previous passwords to access the data sources across the computer network to filter for personal information about the user;
    categorizing a data privacy for respective personal data items of the filtered personal information, wherein the data privacy categorization is dependent upon a level of public availability of a respective personal data item;
    computing the password strength by the data processing system using an algorithm which compares the password to the respective personal data items the filtered personal information about the user and uses the data privacy categorization of the respective personal data item utilized in the password in computing the password strength; and
    presenting feedback to the user through a user interface on a data processing system display regarding the computed password strength.

11. The data processing system of claim 10 wherein the use of previous passwords to access the data sources for each personal data item affects the data privacy categorization for that personal data item.

12. The data processing system of claim 11 wherein the personal information includes multiple personal data items, each personal item being filtered for publicly availability.

13. The data processing system of claim 12 wherein each personal data item is compared to the password by the data processing system to compute password strength.

14. The data processing system of claim 10 further comprising the step of filtering for other passwords utilized by the user, wherein computing the password strength includes the other passwords utilized by the user.

15. The data processing system of claim 10 wherein the network is the internet and a browser plug-in filters for the personal information from multiple websites visited by the user across the internet.

16. The data processing system of claim 10 wherein there are at least three levels of data privacy categorization available for each personal data item based on a public availability of each personal data item and wherein at least one of the three levels of data privacy categorization is based on personal information accessed using previous passwords.

17. The data processing system of claim 10 wherein categorizing the data privacy for respective personal data items includes ranking the data privacy categorization for the personal data items based on the public availability of each personal data item.

18. The data processing system of claim 17 wherein the ranking of the data privacy categorization for the personal data items is based on ratings of the data privacy categorization for the personal data items based on the public availability of each personal data item.

* * * * *